COMPUTER SYSTEM EMPLOYING ELEMENTARY OPERATION MEMORY
Filed Aug. 1, 1966
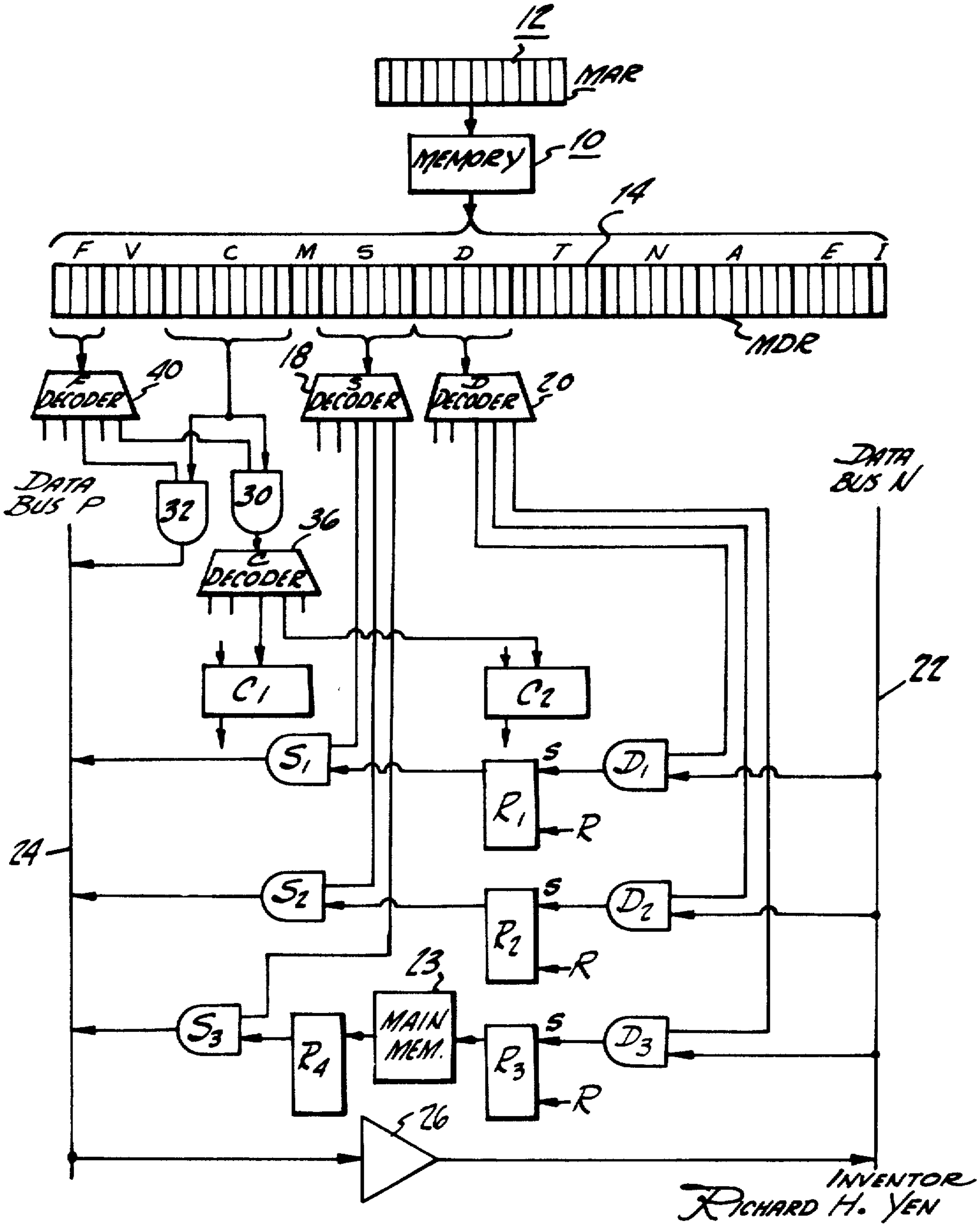
INVENTOR
RICHARD H. YEN
BY Carl V. Olson
Attorney United States Patent Office 3,434,112

Patented Mar. 18, 1969

3,434,112
COMPUTER SYSTEM EMPLOYING ELEMENTARY OPERATION MEMORY

Richard H. Yen, Camden, N.J., assignor to Radio Corporation of America, a corporation of Delaware Filed Aug. 1, 1966, Ser. No. 569,150

U.S. Cl. 340—172.5 3 Claims

Int. Cl. G11b 13/00

ABSTRACT OF THE DISCLOSURE

An arrangement for making binary number constants available in a computer system of the type wherein each instruction is executed by accessing a unique sequence of elementary operation words from a read-only memory. Elementary operation words include a function field, a counter/constant field, and a destination field. Decoding the function and destination fields can result in the transfer of a binary number constant from the counter/constant field to a specified destination register.

This invention relates to computer systems in which each instruction is executed by accessing a unique sequence of elementary operation words from a read-only memory.

In a computer system organization utilizing elementary operation words stored in a read-only memory, each computer instruction causes the accessing of the first one of the elementary operation words needed to execute the instruction. Portions or fields of the accessed elementary operation word are decoded to control certain signal transfers in the computer processor. Each accessed elementary operation word also includes a next address field which is used to automatically access the next following elementary operation word needed to execute the instruction. An instruction may utilize a unique sequence of anywhere from five to two hundred elementary operation words. By way of example, an actual computer has provisions for about one hundred and forty instructions each of which utilizes one unique sequence of elementary operation words stored in a memory containing 2048 elementary operation words. A given elementary operation word may be used to control a signal transfer from the data bus to a given register whenever such a transfer is required in the execution of any one of many instructions. This organization involving elementary operation words stored in a read-only memory can result in a considerable simplification of the control gating complex in a computer processor.

Computers normally contain a plurality of counters used for the purpose of keeping track of the numbers of times certain iterative processes have been performed. In a computer employing elementary operation words, the elementary operation words include a counter field which may contain information identifying a particular counter and specifying how much the count in the counter should be incremented or decremented.

Computers also normally contain a source of a plurality of fixed numbers or constants which are used in controlling the operation of the computer. For example, a constant may be a pattern of "1" and "0" bits forming a mask used in examining selected bits of a data character or an indicators character. Or, a constant may be an address identifying the place in the main memory where changeable information of a given type is always kept. Constants, which are also needed for numerous other purposes, are usually generated by means of a permanently-wired transistor matrix.

It is a general object of this invention to provide a computer system utilizing elementary operation words stored in a read-only memory and including an improved, economical means for supplying binary number constants when needed.

In accordance with an example of the invention there is provided an operation word register including a function field portion, a "constant" field portion and a destination field portion. A function decoder is provided to decode the contents of the function field portion of the operation word register and enable the transfer of the contents of the "constant" field portion of the operation word register to a data bus. A destination decoder is provided to decode the contents of the destination field portion of the operation word register and enable the transfer of the "constant" from the data bus to a selected one of a plurality of data registers.

The sole figure of the drawing is a schematic diagram of a memory system having means according to the invention for generating a binary number constant whenever needed.

Referring now in greater detail to the drawing, there is shown a memory 10 for the storage of a large number, such as 4096, of words, each of which may, according to a specific example, include fifty-three bits. The memory 10 may be a read-only memory constructed so that the reading out of any selected word does not destroy the stored information and therefore does not require the subsequent rewriting of the read-out information. Any one of the words stored in memory 10 may be selected or accessed by the contents of a memory address register 12. Continuing the example, the memory address register 12 may contain space for an address consisting of twelve address bits, which is the number of address bits required to uniquely select any one of 4096 word locations in memory 10.

When a word in memory 10 is addressed by its respective address in the memory address register 12, the word stored in memory 10 is transferred to a memory data register 14. The memory data register is shown to consist of a register for storing the fifty-three bits of an accessed memory word. The fifty-three bits of each stored memory word are divided into several fields designated F, V, C, M, S, D, T, N, A, E and I. The several fields are used for respective purposes as follows.

| Field: | Purpose |
|---|---|
| F | Logic function. |
| V | Variation of logical function. |
| C | Counter control or constant. |
| M | Scratchpad memory control. |
| S | Source register control. |
| D | Destination register control. |
| T | Test for next address branching. |
| N | Normal next address. |
| A | Alternate next address. |
| E | Exception control. |
| I | Interrupt control. |

The contents of the S field is coupled to a source register decoder 18, and the contents of the D field is coupled to a destination register decoder 20. The decoders are conventional decoders having a number of outputs equal to $2^n$ where $n$ is equal to the number of bits in the respective field. Any given pattern of "1" or "0" bits in a field determines the energization of a unique one of the outputs of the corresponding decoder. Three of the outputs of the destination register decoder 20 are shown connected to enable respective destination "and" gates $D_1$, $D_2$ and $D_3$. Each of gates $D_1$, $D_2$ and $D_3$ is a bank of about eight gates for handling signals from eight respective conductors of a data bus 22. The gates $D_1$, $D_2$ and $D_3$, when enabled, pass eight bits of a character from the data bus 22 to respective eight-bit registers $R_1$, $R_2$ and $R_3$. The register $R_3$ is illustrated as an address register for a main memory 23 in the computer system. The main memory has a memory data register $R_4$ for receiving an accessed memory word identified by the contents of the address register $R_3$.

Three of the outputs of the source register decoder 18 are shown coupled in enabling fashion to respective source gates $S_1$, $S_2$ and $S_3$. Each of the source gates $S_1$, $S_2$ and $S_3$ is a bank of eight gates for transferring, when enabled, the contents of the eight-bit registers $R_1$, $R_2$ and $R_4$ to eight conductors of a data bus 24. An eight-bit amplifier 26 is connected from the data bus 22 to the data bus 24 to transfer eight-bit signal characters from one bus to the other.

The contents of the counter control or constant field C of the memory data register 14 is coupled to the input of a bank of eight "and" gates 30, and is coupled to the input of a bank of eight "and" gates 32. Gates 30, when enabled, convey the contents of the field C to a C-field decoder 36. Two of the outputs of the C-field decoder 36 are connected to count changing inputs of two respective counters $C_1$ and $C_2$. The C decoder 36 is constructed to decode six bits of the C field to determine which one of many counters is to be acted upon, and includes means for decoding the other two bits of the C field to determine the amount of incrementing or decrementing which is to be performed on the contents of the selected counter.

The "and" gates 32 operate, when enabled, to transfer the contents of the C field of the memory data register 14 to the data bus 24.

A function decoder 40 is connected to receive the contents of the logical function field F (or the contents of the function field F and also the contents of the function variation field V). The function decoder 40 has a number of outputs including an output connected to enable "and" gates 30 when the contents of the C field is used for counter control, and an output connected to enable "and" gates 32 when the contents of the C field is used for a number constant. The C field may thus be referred to as a counter/constant field.

In the operation of the system shown in the drawing it is assumed that an elementary operation word has been accessed from memory 10 to the memory data register 14. The elementary operaiton word memory data register 14 may be a word calling for the transfer of contents of register $R_1$ to register $R_2$. In this case, the source field S of the elementary operation word contains information which, when decoded, results in the enabling of gates $S_1$. This causes the transfer of the contents of register $R_1$ through bus 24, and through amplifiers 26 to the data bus 22. The destination field D of the accessed elementary operation word contains information which, when decoded by destination decoder 20, results in the enabling of destination gates $D_2$. The enabling of destination gates $D_2$ results in the transfer of the information on data bus 22 to the register $R_2$. In this way, the elementary operation word causes the transfer of information from register $R_1$ to register $R_2$.

The accessed elementary operation word in memory data register 14 also includes a next address field N which is transferred by means (not shown) to the memory address register 12 for use in accessing the next following elementary operation word from memory 10.

The next accessed elementary operation word in memory data register 14 may be a word calling for the incrementing of counter $C_1$. In this case, the function field F of the accessed elementary operation word contains bits which, when decoded by function decoder 40, results in the enabling of "and" gates 30. The contents of the field C of the accessed elementary operation word contains bits identifying the counter $C_1$ and the amount of incrementing to be performed. The contents of the C field is coupled through enabled gates 30 to the C-field decoder 36. The energized output of the C decoder 36 is connected to the selected counter $C_1$ to effect the specified incrementing of the count in the counter. The next address field N in the accessed elementary operation word is then used by means not shown to address a next following operation word.

The next following elementary operation word may be one calling for the transfer of a binary number constant to register $R_1$. In this case, the function field F of the accessed elementary operation word contains bits which, when decoded, result in the enabling of the "and" gates 32. The C field of the accessed elementary operation word contains the binary bits of a particular binary number constant. The bits of the number constant are coupled through enabled gates 32 to the data register 24, and are coupled through amplifiers 26 to the data bus 22. The destination field D of the accessed elementary operation word contains bits which, when decoded by decoder 20, result in the enabling of the destination gates $D_1$. The enabling of destination gates $D_1$ results in the transfer of the number constant from the data bus 22 to the register $R_1$. In this way, an elementary operation word is employed to cause a number constant contained in the elementary operation word to be transferred to the register $R_1$.

The binary number constant in the C field of an elementary operation word may be a number representing the address in the main memory of the computer. In this case, the elementary operation word includes bits in its destination field D which, when decoded, enable the gate $D_3$ so that the binary number constant is transferred to the main memory address register $R_3$.

To summarize, the many different numerical constants needed in the operation of a computer may be included in corresponding elementary operation words permanently stored in read-only memory 10. In each such word, the C field of the word contains the numerical constant, the F field contains information which, when decoded, results in the transfer of the numerical constant to the data bus, and the D field contains information which, when decoded, results in the transfer of the numerical constant from the data bus to a desired destination register. The system is very flexible and economical compared with prior wired-circuit arrangements for generating and utilizing number constants. The economy of the present arrangement is enhanced by the fact that it utilizes the C-field space of elementary operation words. The C-field space of elementary operation words not concerned with the control of counters is otherwise unused. By using this otherwise unused C-field space for numerical constants, the constants are made available at an expense which is trivial compared with the expense of additional special-purpose constant-generation hardware.

What is claimed is:

1. In a computer processor in which each instruction is executed by accessing a unique sequence of elementary operation words, the combination of an operation word register including a function field portion, a counter/constant field portion and a destination field portion.

a function decoder having an input coupled to the function field portion of said operation word register, and having a "constant" output, a data bus, a plurality of data registers, a destination decoder having an input coupled to the destination field portion of said operation word register and having separate outputs for respective data registers, means responsive to a "constant" output from said function decoder to enable the transfer of the contents of the counter/constant field portion of the operation word register to said data bus, and means responsive to an output from said destination decoder to enable the transfer of said constant from said data bus to a selected one of said data registers.

2. In a computer processor in which each instruction is executed by accessing a unique sequence of elementary operation words, the combination of an operation word register including a function field portion and a counter/constant field portion, a plurality of counters each having a count-change input, a counter-control decoder having outputs coupled to count-change inputs of respective counters, a function decoder having an input coupled to the function field portion of said operation word register, and having separate "count" and "constant" outputs, means responsive to a "count" output from said function decoder to enable said counter control decoder to decode the contents of the counter/constant field portion of the operation word register and change the count in a thereby-specified counter, a data bus, and means responsive to a "constant" output from said function decoder to enable the transfer of the contents of the counter/constant field portion of the operation word resistor to said data bus.

3. In a computer processor in which each instruction is executed by accessing a unique sequence of elementary operation words, the combination of an operation word register including a function field portion, a counter/constant field portion and a destination field portion, a plurality of counters each having a count-change input, a counter-control decoder having outputs coupled to count-change inputs of respective counters, a function decoder having an input coupled to the function field portion of said operation word register, and having separate "count" and "constant" outputs, means responsive to a "count" output from said function decoder to enable said counter control decoder to decode the contents of the counter/constant field portion of the operation word register and change the count in a thereby-specified counter, a data bus, a plurality of data registers, a destination decoder having an input coupled to the destination field portion of said operation word register and having separate outputs for respective data registers, means responsive to a "constant" output from said function decoder to enable the transfer of the contents of the counter/constant field portion of the operation word register to said data bus, and means responsive to an output from said destination decoder to enable the transfer of said constant from said data bus to a selected one of said data registers.

References Cited

UNITED STATES PATENTS 3,370,274 2/1968 Kettley et al. ------ 340—172.5

PAUL J. HENON, *Primary Examiner.*

PAUL R. WOODS, *Assistant Examiner.*